(12) United States Patent
Behil et al.

(10) Patent No.: US 6,536,778 B2
(45) Date of Patent: Mar. 25, 2003

(54) RESILIENT METALLIC GASKET

(75) Inventors: Vincent S. Behil, Camas, WA (US); Jon A. Cox, Victor, NY (US); James A. Martini, Honeoye Falls, NY (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 0 days.

(21) Appl. No.: 09/865,848

(22) Filed: May 25, 2001

(65) Prior Publication Data

US 2002/0175479 A1 Nov. 28, 2002

(51) Int. Cl.[7] .................................................. F16L 17/06
(52) U.S. Cl. ........................ 277/609; 277/608; 277/616
(58) Field of Search ................................ 277/602, 608, 277/609, 616, 593, 595, 591

(56) References Cited

U.S. PATENT DOCUMENTS

| | | | |
|---|---|---|---|
| 3,909,011 A | * 9/1975 | Sheesley | ..................... 277/609 |
| 4,114,907 A | 9/1978 | Abbes et al. | |
| 4,155,571 A | * 5/1979 | Gastineau et al. | .......... 277/609 |
| 4,381,869 A | 5/1983 | Abbes et al. | |
| 4,603,892 A | * 8/1986 | Abbes et al. | ................ 277/608 |
| 5,639,100 A | * 6/1997 | Garrigues et al. | .......... 277/608 |

\* cited by examiner

*Primary Examiner*—Anthony Knight
*Assistant Examiner*—E Peavey
(74) *Attorney, Agent, or Firm*—John M. Harrington; Kilpatrick Stockton

(57) ABSTRACT

A gasket assembly is disclosed for use between adjacent flange surfaces which includes a reusable annular base plate having an inner periphery and opposed upper and lower surfaces, and replaceable a spring energized sealing ring releasably retained within the inner periphery of the base plate and including a resilient spring element surrounded by a deformable jacket that extends beyond the upper and lower surfaces of the base plate to conform to surface irregularities in the flange surfaces upon compression of the gasket between the flange surfaces.

25 Claims, 3 Drawing Sheets

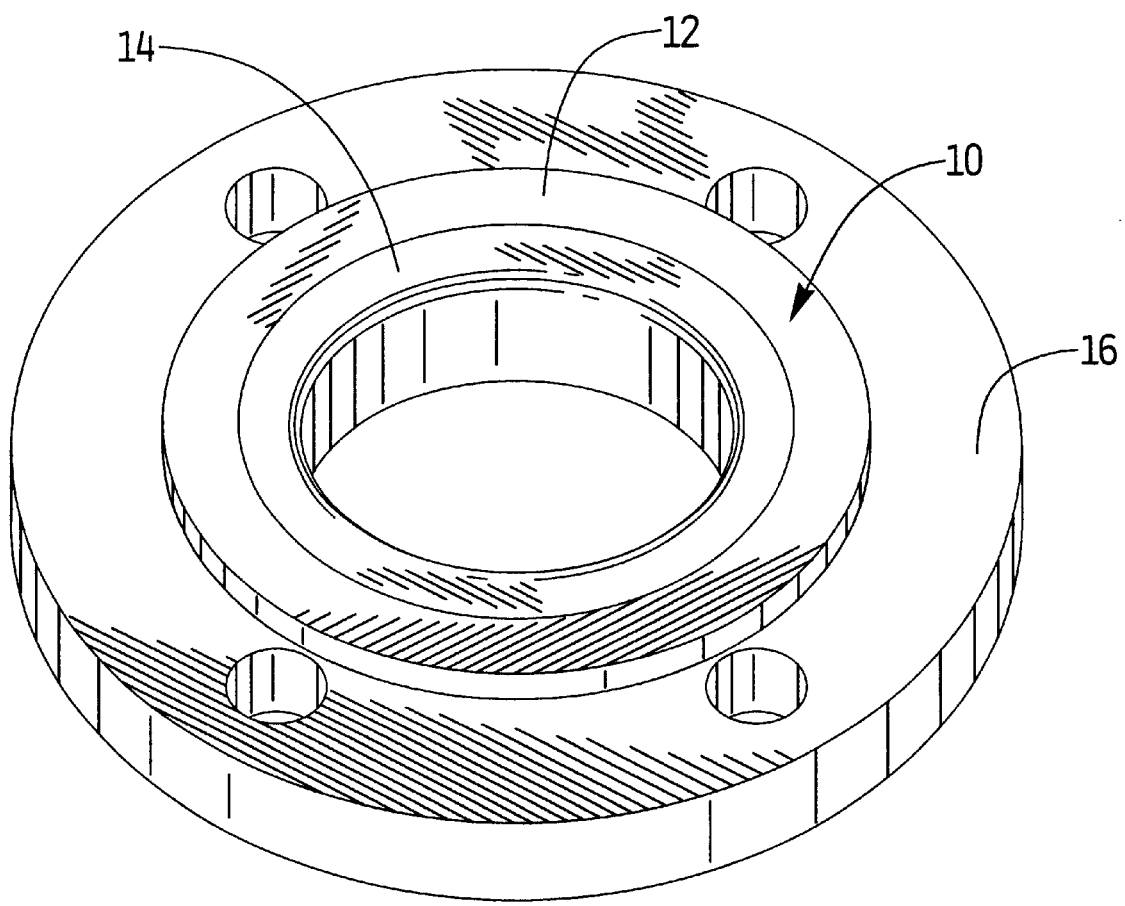
FIG_1

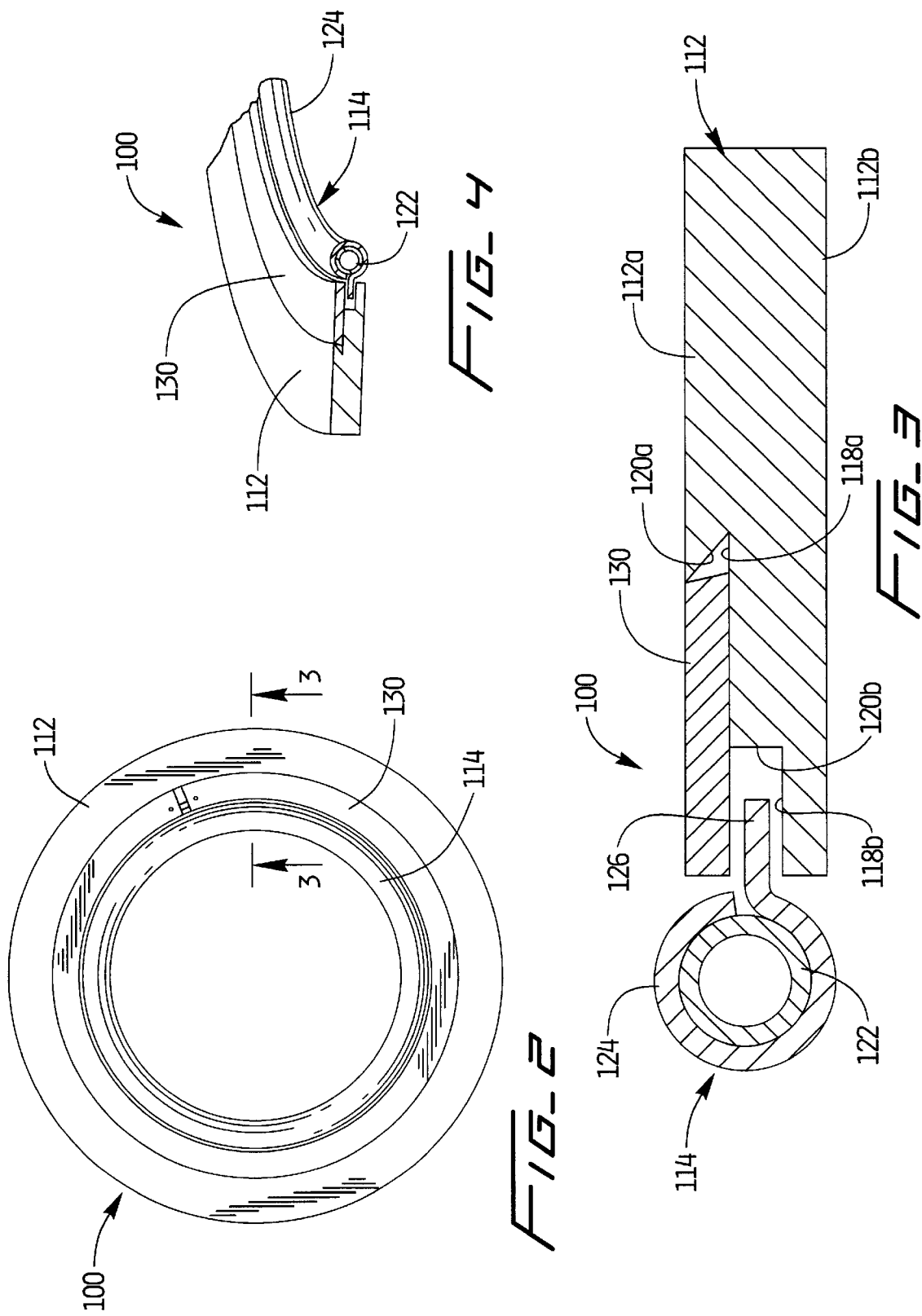

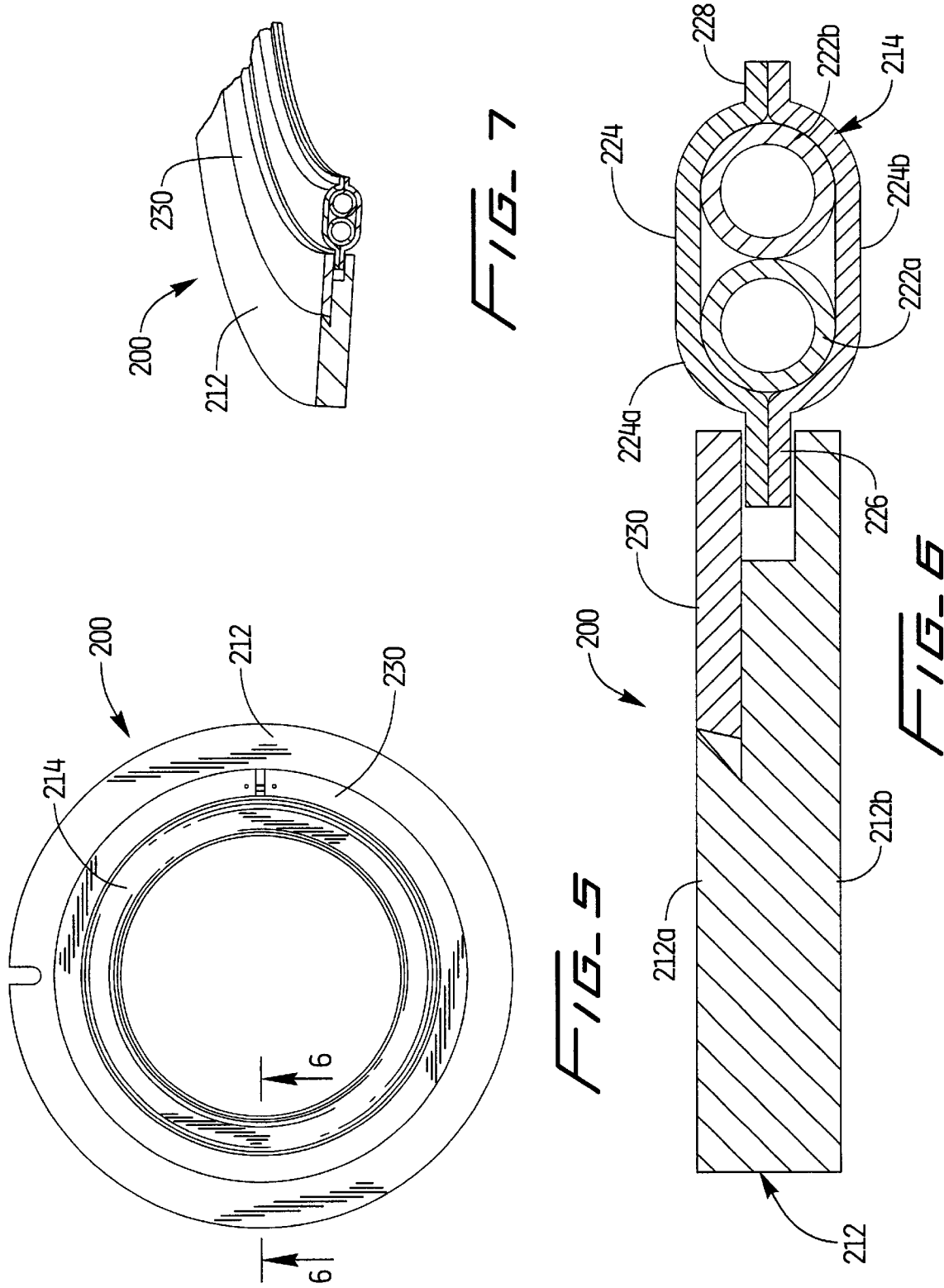

RESILIENT METALLIC GASKET

BACKGROUND OF THE INVENTION

1. Field of the Invention

The subject invention is directed to a resilient metallic gasket, and more particularly, to a metallic gasket assembly for use between opposed pipe flanges which has a reusable base plate and a replaceable spring energized sealing ring.

2. Background of the Related Art

Resilient metallic gaskets are well known in the art and have been utilized in a variety of high performance sealing applications. For example, U.S. Pat. No. 4,114,907 to Abbes et al. discloses a resilient metal gasket of toroidal configuration having a central core consisting of a resilient helical spring that is surrounded by a deformable envelope of metal or plastic. In use, the spring provides an elastic recovery force against a crushing stress applied to the outer envelope to enhance the sealing characteristics of the device. Because the outer envelope is plastically deformed during service, the entire device must be discarded after its first use.

U.S. Pat. No. 4,381,869 to Abbes et al. discloses a resilient metallic gasket having two sealing lines interconnected by a structural template. The two sealing lines consist of contiguous helical springs that are surrounded by a ductile metal casing. Once again, the outer metal casing is plastically deformed during service. Thus, the entire device must be discarded after its first use. It would be beneficial therefore, to provide a resilient metallic gasket that has reusable components so as to provide a cost advantage over prior art sealing devices of this type.

SUMMARY OF THE INVENTION

The subject invention is directed to a new, useful and cost-effective sealing device, and more particularly, the subject invention provides a high performance gasket assembly for use on rough surfaced flanges throughout a broad range of seating loads. The gasket assembly of the subject invention includes a reusable annular base plate having an inner periphery and opposed upper and lower surfaces, and a replaceable spring energized sealing ring that is releasably retained within the inner periphery of the base plate.

The sealing ring includes at least one resilient spring element surrounded by a deformable jacket that extends beyond the upper and lower surfaces of the base plate to conform to surface irregularities in the flange surfaces upon compression of the gasket between the flange surfaces. Accordingly, the jacket is comprised of a material having a greater ductility than the flange surfaces.

Preferably, an annular groove extends radially outwardly from the inner periphery of the base plate, between the upper and lower surfaces thereof, for retaining a radially outer portion of the sealing ring. The jacket has a radially outwardly extending annular flange releasable retained within the annular groove of the base plate. The annular groove is defined at least in part by a retainer ring releasable engaged within the inner periphery of the base plate. In one embodiment of the invention, the retainer ring is releasably engaged to the base plate by an interference fit, and in another embodiment the retainer ring is a compressible c-ring. Alternative retention means may also be employed.

In accordance with a preferred embodiment of the subject invention, the gasket assembly includes an annular base plate having an inner periphery and opposed upper and lower surfaces. An annular groove extends radially outwardly from the inner periphery of the base plate between the opposed upper and lower surfaces thereof. A spring energized sealing ring is operatively associated with the inner periphery of the base plate and includes at least one resilient sealing element surrounded by a deformable jacket. The jacket has a radially outwardly extending annular flange releasably retained within the annular groove of the base plate. The jacket extends beyond the upper and lower surfaces of the base plate to conform to surface irregularities in the flange surfaces upon compression of the gasket between the flange surfaces.

The subject invention is also directed to a gasket assembly for use between adjacent flange surfaces that includes an annular base plate having an outer periphery, an inner periphery, and opposed upper and lower surfaces, and includes a stepped annular groove. The annular groove extends radially outwardly from the inner periphery of the base plate between the opposed upper and lower surfaces thereof. The annular groove has an upper step adjacent the upper surface of the base plate and a lower step adjacent the lower surface of the base plate.

The gasket assembly further includes a spring energized sealing ring operatively associated with the inner periphery of the base plate and including at least one resilient spring element surrounded by a ductile jacket. The jacket extends beyond the upper and lower surfaces of the base plate to conform to surface irregularities in the flange surfaces upon compression of the gasket between the flange surfaces, and the jacket has a radially outwardly extending annular flange. The gasket further includes a retainer structure, such as a ring releasably engaged with the upper step of the base plate in such a manner so that the annular flange of the jacket is retained between the retainer ring and the lower step of the base plate.

It is envisioned that the spring energized sealing ring of the subject invention may be employed either alone or in combination with the base plate. Accordingly, the subject invention is also directed to a sealing device for use between adjacent flange surfaces which includes first and second radially adjacent annular spring elements and a deformable jacket surrounding the first and second annular spring elements. The jacket is formed from a material having a greater ductility than the flange surfaces so that it conforms to surface irregularities in the flange surfaces upon compression between the flange surfaces.

These and other aspects of the subject invention and the method of using the same will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention pertains will more readily understand how to make and use the gasket assembly of the subject invention, preferred embodiments thereof will be described in detail hereinbelow with reference to the drawings, wherein:

FIG. 1 is perspective view of a gasket assembly constructed in accordance with a preferred embodiment of the subject invention in conjunction with a pipe flange;

FIG. 2 is top plan view of an embodiment of the gasket assembly of the subject invention that includes a replaceable energized sealing ring with one resilient spring element;

FIG. 3 is an enlarged cross-sectional view of the gasket assembly of FIG. 2 taken along line A—A of FIG. 2;

FIG. 4 is partial perspective view of the gasket assembly of FIG. 2 in cross-section to illustrate the resilient spring element thereof;

FIG. 5 is top plan view of another embodiment of the gasket assembly of the subject invention that includes a replaceable energized sealing ring with two resilient spring elements;

FIG. 6 is an enlarged cross-sectional view of the gasket assembly of FIG. 5 taken along line A—A of FIG. 5; and FIG. 7 is partial perspective view of the gasket assembly of FIG. 5 in cross-section to illustrate the radially adjacent resilient spring elements thereof.

DETAILED DESCRIPTION OF PREFERRED EMBODIMENTS

Referring now to the drawings wherein like reference numerals identify similar structural features of the sealing devices disclosed herein, there is illustrated in FIG. 1 a gasket assembly constructed in accordance with a preferred embodiment of the subject invention and designated generally by reference numeral 10. The gasket assembly 10 has two primary components, namely, a reusable limiter plate or base plate 12 and a replaceable sealing ring 14. The base plate 12 serves several functions. It serves as a compression limiter to prevent over-compression of the sealing ring beyond the optimal force needed to effect a proper seal. It also acts as a structural support for the sealing ring and a centering structure to properly seat the sealing ring. In addition, in the case of a catastrophic failure of the sealing ring, the limiter plate can prevent a hazardous blow-out condition.

Gasket assembly 10 is employed between opposed pipe flanges, such as the pipe flange 16 shown in FIG. 1. In use, when the opposed pipe flanges are separated from one another for servicing, the sealing ring 14 is separated from the base plate 12 and discarded. Thereafter, a new sealing ring 14 is releasably secured to the base plate 12 and the gasket assembly 10 is once again placed into service between the opposed pipe flanges. The gasket assembly of the subject invention is extremely useful and cost effective in high temperature, pressure and corrosive media pipe applications that require frequent disassembly and assembly.

As discussed in greater detail herein below, the replaceable sealing ring 14 is energized by one or more resilient spring elements and includes a deformable jacket. The jacket is comprised of a material having a greater ductility than the bolted pipe flange surfaces such that the jacket plastically deforms and conforms to surface irregularities in the flange surfaces upon compression of the gasket 10 between the flange surfaces. It is envisioned that the spring energized sealing ring 14 of the subject invention may be used alone or in combination with the base plate.

Referring now to FIGS. 2 through 4, there is illustrated a rebuildable gasket assembly 100 constructed in accordance with a preferred embodiment of the subject invention. Gasket assembly 100 includes a reusable annular base plate 112 having an outer periphery, an inner periphery and opposed upper and lower surfaces 112a and 112b. A stepped annular groove extends radially outwardly from the inner periphery of the base plate 112 between the opposed upper and lower surfaces 112a, 112b, as best seen in FIG. 3. The annular groove has an upper step 118a adjacent the upper surface 112a of base plate 112 with an angled riser 120a and a lower step 118b adjacent the lower surface 112b of base plate 112 with a vertical riser 120b.

Gasket assembly 100 further includes a replaceable spring energized sealing ring 114 that is operatively associated with the inner periphery of the base plate 112. The sealing ring 114 includes a resilient tubular bulb or spring element 122 surrounded by a soft, ductile jacket 124 that extends beyond the upper and lower surfaces 112a, 112b of base plate 112. In use, when the gasket assembly is seated between opposed pipe flanges that are bolted together, the pressure developed between the spring element 122 and the flange deforms the jacket 124, causing the ductile material to yield and fill the surface imperfections in the flange face. Spring element 122 is preferably a close-wound helical spring or a similar mechanical element adapted and configured to provide a restoration force during sealing. In use, each coil of the helical spring acts independently and allows the jacket to conform to surface irregularities in the flange surfaces. Jacket 124 has a radially outwardly extending annular flange 126 to facilitate operative integration of the sealing ring 114 with the base plate 112.

A retainer ring 130 is releasably engaged with the upper step 118a of base plate 112 in such a manner so that the annular flange 126 of jacket 124 is retained between the retainer ring 130 and the lower step 118b of the base plate. It should be noted that the retainer ring merely captures the flange 126 of jacket 124. It does not positively engage the flange 126 within the inner periphery of base plate 112, as such an engagement is not necessary for the base plate to achieve the supporting, centering and compression limiting functions thereof. As illustrated in FIG. 2, retainer ring 130 is a compressible c-ring that has a normally expanded condition for engaging the angled riser 120a of upper step 118a. Alternatively, the retainer ring may be a solid ring configured to engage the base plate 112 by an interference fit. It is envisioned that other retention mechanisms or structures may be utilized to engage flange 126 within the inner periphery of the base plate 112, for example, a resilient biasing mechanism, such as a wire form or the like. It is also envisioned, and well within the scope of the subject disclosure that the spring energized sealing ring 114 of the subject invention may be employed without base plate 112, or in conjunction with an alternative compression limiting structure.

Referring now to FIGS. 5 through 7, there is illustrated another gasket assembly 200 constructed in accordance with a preferred embodiment of the subject invention. Gasket assembly 200 is substantially similar to gasket assembly 100 in that it includes a reusable annular base plate 212, a replaceable spring energized sealing ring 214, and a retainer ring 230 releasably retaining the spring element 214 within the inner periphery of the base plate 212. Gasket assembly 200 differs from gasket assembly 100 in that the replaceable sealing ring 214 includes two radially adjacent resilient spring elements 222a and 222b surrounded by a soft, ductile jacket 224. The side-by-side dual spring configuration of sealing ring 214 provides a larger sealing surface than that provided by sealing ring 114, and provides multiple circumferential pressure points to effect a seal on extremely rough or uneven flange surfaces.

Jacket 224 is of two-piece construction and extends beyond the upper and lower surfaces 212a, 212b of base plate 212 to conform to surface irregularities in the flange surfaces upon compression of the gasket assembly 200 between the flange surfaces. Jacket 224 has a radially outwardly extending annular flange 226 and a radially inwardly extending annular flange 228. Flange 226 is adapted and configured for capture within the inner periphery of base plate 212 by retainer ring 230 in the manner described above with respect to gasket assembly 100. The two-part jacket 224 includes jacket portions 224a and 224b which are hermetically sealed along annular flange 228 by welding, or a similar joining method. It is envisioned, and well within the scope of the subject disclosure that the dual spring energized sealing ring 214 of the subject invention may be employed without base plate 212, or in conjunction with an alternative compression limiting structure.

In accordance with the subject invention, the replaceable sealing rings 114, 214 are formed from a metallic material. Depending upon the media flowing through the pipe, the sealing ring material is chosen to resist corrosion. Similarly, the reusable base plates 112, 212 and retainer rings 130, 230 are formed from a corrosion resistant metallic material. It is envisioned that the deformable jackets 124, 224 may be comprised of multiple layers of a ductile material. This would improve its ability to deform and conform to surface irregularities in the pipe flanges. It is also envisioned that the deformable jackets can be made from a plastic material, or a metal-plastic combination, such as a metal layer sandwiched between two plastic layers, or a plastic layer sandwiched between two metal layers.

Although the gasket assembly of the subject invention has been described with respect to preferred embodiments, those skilled in the art will readily appreciate that changes and modifications may be made thereto without departing from the spirit and scope of the present invention as defined by the appended claims. For example, it is envisioned that the spring energized sealing ring of the subject invention may be employed either alone or in conjunction with the base plate.

What is claimed is:

1. A gasket assembly for use between adjacent flange surfaces comprising:
    a) a reusable annular base plate having an inner periphery and opposed upper and lower surfaces, and including an annular groove extending radially outwardly from the inner periphery of the base plate between the opposed upper and lower surfaces thereof; and
    b) a replaceable spring energized sealing ring operatively associated with the inner periphery of the base plate and including at least one resilient sealing element surrounded by a deformable jacket, the jacket having a radially outwardly extending annular flange releasable retained within the annular groove of the base plate, the jacket extending beyond the upper and lower surfaces of the base plate to conform to surface irregularities in the flange surfaces upon compression of the gasket assembly between the flange surfaces.

2. A gasket assembly as recited in claim 1, wherein the jacket is comprised of a material having a greater ductility than the flange surfaces.

3. A gasket assembly as recited in claim 1, wherein the annular groove is defined at least in part by a retainer ring releasable engaged within the inner periphery of the base plate.

4. A gasket assembly as recited in claim 3, wherein the retainer ring is releasably engaged to the base plate by an interference fit.

5. A gasket assembly as recited in claim 3, wherein the retainer ring is a compressible c-ring.

6. A gasket assembly as recited in claim 1, wherein the sealing ring includes two radially adjacent spring elements.

7. A gasket assembly as recited in claim 6, wherein the two radially adjacent spring elements are surrounded by a two-part jacket.

8. A gasket assembly as recited in claim 7, wherein the two radially adjacent spring elements are hermetically sealed within the two-part jacket.

9. A gasket assembly as recited in claim 1, wherein the sealing ring is formed from a metallic material.

10. A gasket assembly as recited in claim 1, wherein the jacket is comprised of multiple layers of a ductile material.

11. A gasket assembly as recited in claim 1, wherein the base plate and retainer ring are formed from a corrosion resistant metallic material.

12. A gasket assembly for use between adjacent flange surfaces comprising:
    a) a reusable annular base plate having an outer periphery, an inner periphery, and opposed upper and lower surfaces, and including a stepped annular groove extending radially outwardly from the inner periphery of the base plate between the opposed upper and lower surfaces thereof, the annular groove having an upper step adjacent the upper surface of the base plate and a lower step adjacent the lower surface of the base plate;
    b) a replaceable spring energized sealing ring operatively associated with the inner periphery of the base plate and including at least one resilient spring element surrounded by a ductile jacket, the jacket extending beyond the upper and lower surfaces of the base plate to conform to surface irregularities in the flange surfaces upon compression of the gasket assembly between the flange surfaces, the jacket having a radially outwardly extending annular flange; and
    c) a retainer ring releasable engaged with the upper step of the base plate in such a manner so that the annular flange of the jacket is retained between the retainer ring and the lower step of the base plate.

13. A gasket assembly as recited in claim 12, wherein the jacket is comprised of a material having a greater ductility than the flange surfaces.

14. A gasket assembly as recited in claim 12, wherein the retainer ring is releasably engaged to the base plate by an interference fit.

15. A gasket assembly as recited in claim 12, wherein the retainer ring is a compressible c-ring.

16. A gasket assembly as recited in claim 12, wherein the sealing ring includes two radially adjacent spring elements.

17. A gasket assembly as recited in claim 16, wherein the two radially adjacent spring elements are surrounded by a two-part jacket.

18. A gasket assembly as recited in claim 12, wherein the sealing ring is formed from a metallic material.

19. A gasket assembly as recited in claim 12, wherein the jacket is comprised of multiple layers of a ductile material.

20. A gasket assembly as recited in claim 12, wherein the base plate and retainer ring are formed from a corrosion resistant metallic material.

21. A gasket assembly as recited in claim 12, wherein the at least one resilient spring element is a continuous helical spring.

22. A sealing device for use between adjacent flange surfaces comprising:
    a) first and second radially adjacent annular spring elements; and
    b) a deformable jacket surrounding the first and second annular spring elements and formed from a material having a greater ductility than the flange surfaces, such that the jacket conforms to surface irregularities in the flange surfaces upon compression between the flange surfaces.

23. A sealing device as recited in claim 22, wherein the two radially adjacent spring elements are surrounded by a two-part deformable jacket.

24. A sealing device as recited in claim 22, wherein the jacket is comprised of multiple layers of a ductile material.

25. A sealing device as recited in claim 22, wherein each of the spring elements is a continuous helical spring.

* * * * *